Oct. 20, 1959
J. C. WILBORN
2,909,389
AUTOMATIC WHEEL BALANCER
Filed Nov. 18, 1954
2 Sheets-Sheet 1
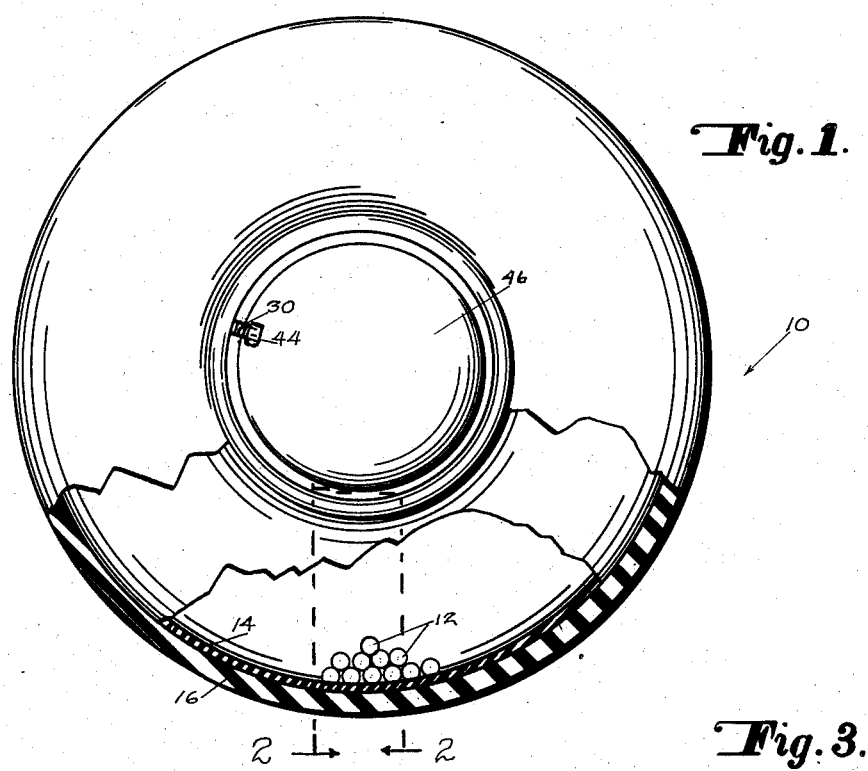
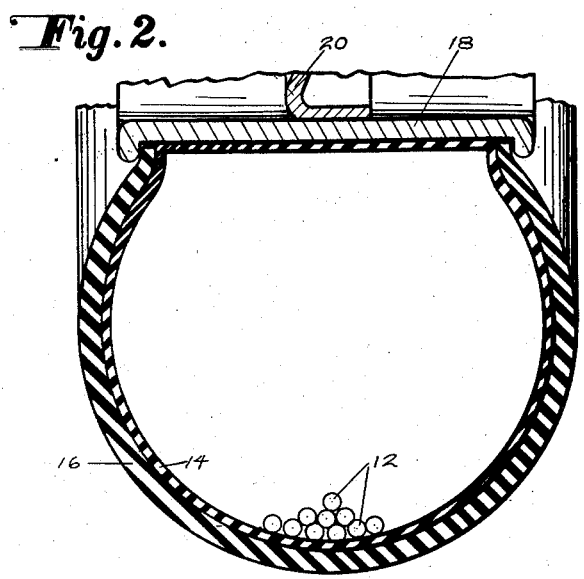
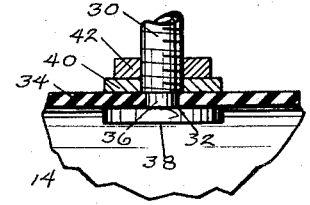
INVENTOR.
J.C. Wilborn
BY Arthur H. Sturges.
Attorney.

Oct. 20, 1959  J. C. WILBORN  2,909,389
AUTOMATIC WHEEL BALANCER
Filed Nov. 18, 1954  2 Sheets-Sheet 2
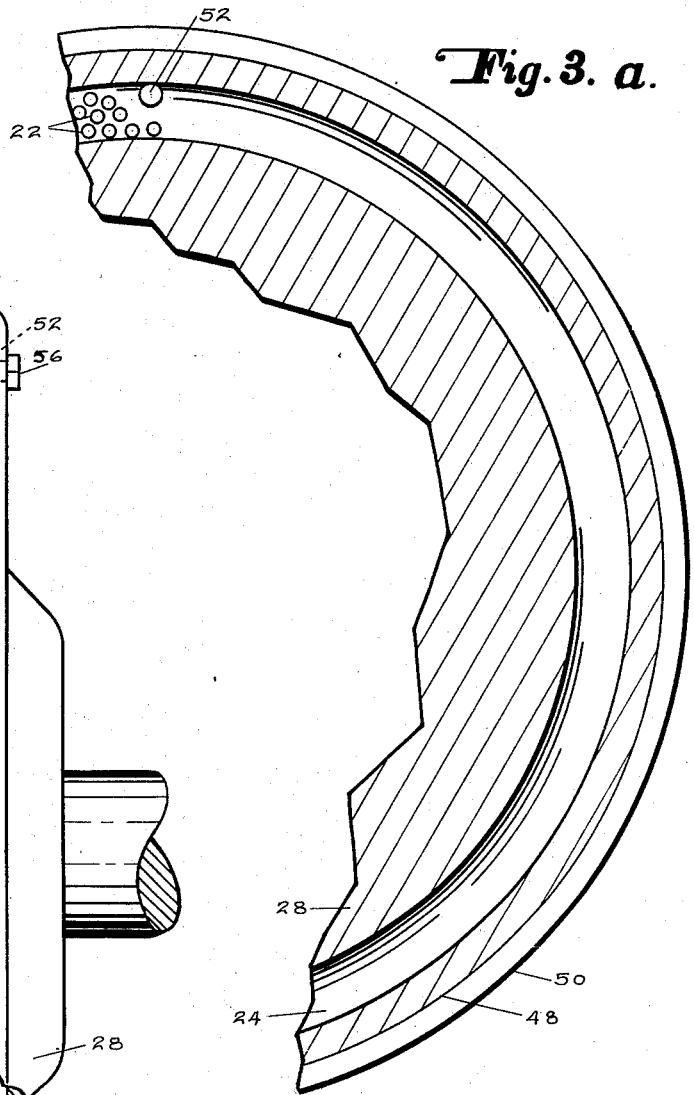
Fig. 3. a.
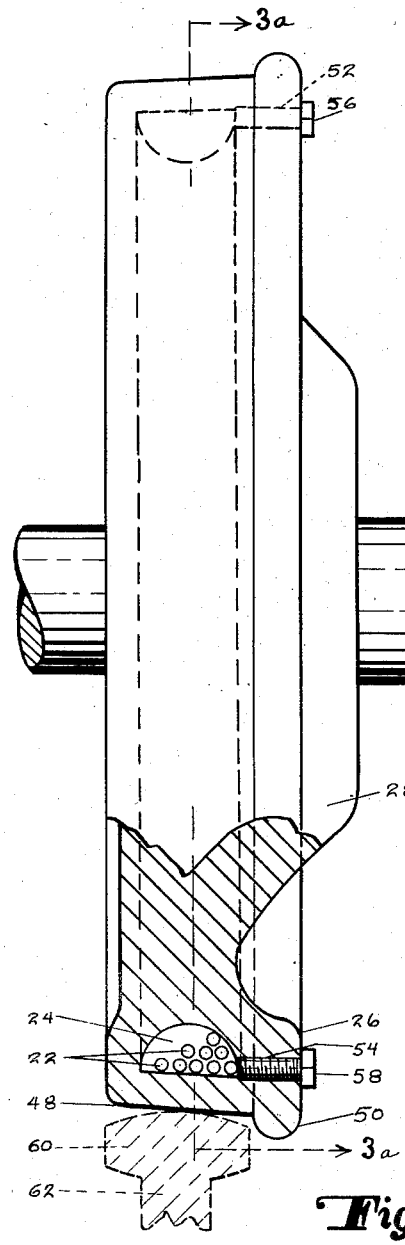
Fig. 1. a.
Fig. 2. a.
Fig. 4. a.
INVENTOR.
J.C. Wilborn
BY Arthur H. Sturges.
Attorney.

United States Patent Office 2,909,389
Patented Oct. 20, 1959

2,909,389

AUTOMATIC WHEEL BALANCER

John C. Wilborn, Shattuck, Okla.

Application November 18, 1954, Serial No. 469,642

2 Claims. (Cl. 301—5)

This invention relates to balancing means for wheels of vehicles, such as wheels of motor vehicles, railway cars and the like, and in particular a plurality of globular weights positioned in a tire or rim of a wheel whereby the globular weights are free to travel with the rotation of the wheel and, consequently, are adapted to seek positions in the tire, rim, or the like for correcting imbalance of the wheel.

The purpose of this invention is to accurately correct imbalance of wheels of traveling vehicles to reduce vibration and lessen wear in shock absorbers, steering assemblies, and other parts of the vehicles.

Various methods have been used to balance motor vehicle wheels, and also wheels of railway cars and the like, and whereas bolts and lugs have been added to railway car wheels, the most common method of balancing wheels of motor vehicles is to crimp lead weights on edges of rims of the wheels, and such weights are often misplaced in changing tires or repairing tubes. Furthermore, when a tire is removed and replaced it would be very unlikely that it would be returned to the same position on the wheel. It will be appreciated, therefore, that very few motor vehicles are operated with perfectly balanced wheels, and wheels that are not balanced cause vibration in the vehicle, uneven wear on the tires, and also excessive wear in the bearings, shock absorbers, steering mechanism, and other parts of the vehicle.

The object of this invention is, therefore, to provide means for balancing wheels, such as motor vehicle and railway car wheels whereby the wheels remain in balance continuously.

Another object of the invention is to provide an improved method of balancing wheels whereby imbalance of the wheels is corrected continuously as the wheels are traveling.

Another important object of the invention is to provide balancing elements in a motor vehicle or railway car wheel wherein the elements are retained in position by centrifugal forces of the wheel.

A further object of the invention is to provide balancing elements for a wheel in which the quantity of the balancing elements is adapted to be varied to compensate for the size and other characteristics of the wheel.

A still further object of the invention is to provide means for balancing wheels, such as motor vehicle and railway car wheels, in which the wheels are retained in balance continuously, in which the balancing means is simple and economical.

With these and other objects and advantages in view the invention embodies a plurality of globular weights freely positioned in a tire on a wheel or in an annular cavity in the rim of a wheel, wherein upon rotation of the wheel the weights are positioned by centrifugal force to balance the wheel.

Other features and advantages of the invention will appear from the following description taken in connection with the drawings, wherein:

Figure 1 is a side elevational view of a wheel having a pneumatic tire thereon with parts of the tire and also parts of a tube therein broken away showing globular weights in the tube, the wheel being shown in a stationary position wherein the weights are in a group in the lower side of the tube.

Figure 2 is a cross section through one side of the wheel taken on line 2—2 of Figure 1, with the parts shown on an enlarged scale, and also with the weights positioned in a group in the lower side of the tube.

Figure 3 is a view showing one of the globular weights, the weight being shown on an enlarged scale.

Figure 4 is a cross section through an inner tube of a pneumatic tire taken at the point where the conventional valve is mounted in the tube, also with the parts shown on an enlarged scale, and with parts broken away.

Figure 1a is a view looking toward the edge of a railway car wheel with parts of the axle thereof broken away, and also with the lower part of the wheel broken away to show a cavity with globular weights therein.

Figure 2a is a view showing a cross section through the upper part of a rail, the rail being shown in broken lines.

Figure 3a is a fragmentary section taken on line 3a—3a of Figure 1a showing a portion of the railway car wheel.

Figure 4a is a view showing one of the globular weights with the weight shown on an enlarged scale.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating globular weights, such as used in an inner tube 14 of a tire 16 on a rim 18 of a wheel 20, shown in Figures 1 to 4, and numeral 22 globular weights, such as used in an annular cavity 24 of a rim 26 of a railway car wheel 28, as shown in Figures 1a to 4a.

In the detail shown in Figure 4, a stem 30 of a conventional tire valve is shown mounted in an opening 32 of a wall 34 of the tube 14 with a neck 36 of reduced diameter positioned in the opening, and with a head 38 on the end of the neck positioned inside of the tube. A washer 40 of substantially the same size as the head 38 is secured against the outer surface of the wall 34 with a nut 42 which is threaded on the stem 30.

In the manufacture of the tube, and before the valve assembly is mounted in the wall of the tube, a plurality of the globular weights 12 are placed through the opening 32 whereby the weights are permanently positioned in the tube, and with the valve assembly in position and the tube installed in a tire on a wheel the weights are thrown against the inner surface of the outer wall of the tube as the wheel rotates, and imbalance of the wheel is corrected by the position assumed by the weights.

As shown in Figure 1, the valve stem is provided with a cap 44 and the wheel with a hub cap 46.

It will be appreciated that the shape and design of the inner tube 14 and tire 16 are only suggestive, as the globular weights are adapted to be used in tubes and tires of various sizes, shapes and designs.

It will also be understood that the railway car wheel 28, shown in Figures 1a and 3a, is only suggestive as this wheel may also be of any suitable shape or design.

As shown in Figure 1a, the wheel 28 is provided with a tread 48 and a flange 50, and threaded openings 52 and 54 are provided in the rim 26 through which the globular weights 22 may be inserted in the annular cavity or chamber 24. The openings 52 and 54 are closed with cap screws 56 and 58, whereby the globular weights are sealed in the rim of the wheel.

The rail shown in broken lines in Figure 2a is provided with a head 60 and a web 62, which extends from the conventional flange.

The annular cavity or chamber 24 is formed by core means in the rim of the wheel as the wheel is cast, and sand, particles of metal, and the like may be removed from the cavity through the openings 52 and 54. The wheels may be provided with one, two, or any suitable number of such openings, as may be desired.

These openings are also adapted to be used for removing and replacing the globular weights, should the weights become battered and worn from use.

Railway car wheels are subjected to continuous pounding in running over rail joints, switches and the like, with the result that imbalance is very common in such wheels, and wheels that are out of balance pound, and, consequently, damage rails continuously.

The globular weights being freely positioned in inner tubes and rims of wheels provide means for correcting imbalance whereby such wheels with globular weights therein are maintained in perfect balance continuously.

With the weights positioned in the tire casing, shoe, or tube, or in the annular recess on the inside of the peripheral wall of the wheel the weights are in extreme positions at the periphery of the tire or rim whereby the maximum balancing effect is obtained.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to, in actual practice, if desired.

Having now described the invention that which is claimed to be new and desired to be procured by Letters Patent is:

1. In a balanced wheel, the combination which comprises a wheel rim, a tire of elastic material mounted on the rim, the interior of the tire being open and providing a relatively large open area extended continuously around the interior of the tire, and a plurality of globular weights freely positioned in the tire, the interior area of the tire being of such dimensions that the weights may be positioned in layers and whereby all of the weights may accumulate at one point in the tire, and the inner surface of the wall of the tire being smooth and free of all obstructions whereby the weights travel freely around the tire, balancing the tire, as the wheel rotates.

2. In a balanced wheel, the combination which comprises a wheel rim, a tire of elastic material mounted on the rim, the interior of the tire being open and providing a relatively large open area extended continuously around the interior of the tire, and a plurality of globular weights freely positioned in the tire, and the inner surface of the wall of the tire being smooth and free of all obstructions whereby the weights travel freely around the tire, balancing the tire, as the wheel rotates.

References Cited in the file of this patent

UNITED STATES PATENTS

| | | |
|---|---|---|
| 1,314,005 | Louden | Aug. 26, 1919 |
| 2,142,021 | Ernst et al. | Dec. 27, 1938 |
| 2,507,558 | Dall et al. | May 16, 1950 |
| 2,687,918 | Bell et al. | Aug. 31, 1954 |
| 2,695,047 | Ruck | Nov. 23, 1954 |
| 2,771,240 | Gurin | Nov. 20, 1956 |

FOREIGN PATENTS

| | | |
|---|---|---|
| 1,054,548 | France | Oct. 7, 1953 |